(12) United States Patent
Stark et al.

(10) Patent No.: US 11,364,928 B1
(45) Date of Patent: *Jun. 21, 2022

(54) DRIVER TRANSITION ASSISTANCE FOR TRANSITIONING TO MANUAL CONTROL FOR VEHICLES WITH AUTONOMOUS DRIVING MODES

(71) Applicant: Waymo LLC, Mountain View, CA (US)

(72) Inventors: Ethan Stark, Sunnyvale, CA (US); Daniel Trawick Egnor, Palo Alto, CA (US); Ryan Cash, Sunnyvale, CA (US); Andrew Schultz, Piedmont, CA (US)

(73) Assignee: Waymo LLC, Mountain View, CA (US)

(*) Notice: Subject to any disclaimer, the term of this patent is extended or adjusted under 35 U.S.C. 154(b) by 272 days.

This patent is subject to a terminal disclaimer.

(21) Appl. No.: 16/685,209

(22) Filed: Nov. 15, 2019

Related U.S. Application Data

(63) Continuation of application No. 15/718,477, filed on Sep. 28, 2017, now Pat. No. 10,513,273.

(51) Int. Cl.
| | |
|---|---|
| *G01C 22/00* | (2006.01) |
| *B60W 50/10* | (2012.01) |
| *G05D 1/02* | (2020.01) |
| *G05D 1/00* | (2006.01) |

(52) U.S. Cl.
CPC ........... *B60W 50/10* (2013.01); *G05D 1/0088* (2013.01); *G05D 1/0223* (2013.01); *B60W 2540/12* (2013.01); *B60W 2540/18* (2013.01); *B60W 2720/106* (2013.01); *B60W 2720/24* (2013.01); *G05D 2201/0213* (2013.01)

(58) Field of Classification Search
CPC ............ B60W 50/10; B60W 2540/12; B60W 2720/24; B60W 2540/18; B60W 2720/106; G05D 1/0223; G05D 1/0088; G05D 2201/0213; G01C 22/00
USPC .......................................................... 701/23
See application file for complete search history.

(56) References Cited

U.S. PATENT DOCUMENTS

| | | | |
|---|---|---|---|
| 9,342,074 B2 | 5/2016 | Dolgov et al. | |
| 9,365,213 B2 | 6/2016 | Stenneth et al. | |
| 10,513,273 B1* | 12/2019 | Stark | G05D 1/0223 |
| 2014/0088814 A1* | 3/2014 | You | G05D 1/0061 |
| | | | 701/23 |
| 2014/0156134 A1* | 6/2014 | Cullinane | B60W 50/082 |
| | | | 701/23 |

(Continued)

*Primary Examiner* — Shardul D Patel
(74) *Attorney, Agent, or Firm* — Botos Churchill IP Law

(57) ABSTRACT

Aspects of the disclosure relate to controlling a transition between a manual driving mode and an autonomous driving mode of a vehicle. For instance, one or more processors of one or more control computing devices may control the vehicle in the autonomous driving mode. While controlling the vehicle in the autonomous driving mode and decelerating at a given rate, the processors may receive at a user input of the vehicle input requesting a transition from the autonomous driving mode to the manual driving mode. In response to the input, the processors may transition the vehicle to the manual driving mode. After transitioning the vehicle to the manual driving mode, the processors may send deceleration signals to a deceleration actuator thereby causing the vehicle to continue to decelerate at the given rate.

20 Claims, 7 Drawing Sheets

(56) References Cited

U.S. PATENT DOCUMENTS

| | | | |
|---|---|---|---|
| 2014/0303827 A1* | 10/2014 | Dolgov | B60W 30/00 701/23 |
| 2014/0336935 A1* | 11/2014 | Zhu | G01S 17/86 702/3 |
| 2015/0006005 A1* | 1/2015 | Yu | G06Q 50/28 701/22 |
| 2015/0283998 A1* | 10/2015 | Lind | B60W 30/17 701/23 |
| 2016/0107655 A1 | 4/2016 | Desnoyer et al. | |
| 2018/0154932 A1* | 6/2018 | Rakouth | B62D 1/286 |
| 2018/0157256 A1* | 6/2018 | Oniwa | G05D 1/0061 |
| 2018/0194364 A1* | 7/2018 | Asakura | B60W 50/0205 |
| 2018/0208211 A1* | 7/2018 | Chiba | B60W 50/08 |
| 2018/0284807 A1* | 10/2018 | Wood | G07C 5/006 |
| 2018/0370543 A1* | 12/2018 | Poeppel | B60W 35/00 |
| 2019/0071112 A1* | 3/2019 | Toddenroth | B60R 21/2032 |

* cited by examiner

DRIVER TRANSITION ASSISTANCE FOR TRANSITIONING TO MANUAL CONTROL FOR VEHICLES WITH AUTONOMOUS DRIVING MODES

CROSS REFERENCE TO RELATED APPLICATION

This application is a continuation of U.S. patent application Ser. No. 15/718,477, filed Sep. 28, 2017, the entire disclosure of which is incorporated herein by reference.

BACKGROUND

Some vehicles may operate in various modes which provide different levels of control to a driver. For instance, typical vehicles may operate in manual driving modes, where a driver controls acceleration, deceleration, and steering of the vehicle as well as semi-autonomous mode, such as cruise control, where computing devices of the vehicle control acceleration and deceleration while a driver controls steering, etc. In some instances, these vehicles may also operate in autonomous driving modes where the computing devices of the vehicle controls all of braking, all of the acceleration, deceleration and steering of the vehicle without continuous input from a driver or passenger. In the autonomous mode, the passenger may provide some initial input, such as a destination location, and the vehicle maneuvers itself to that destination.

Typically when operating in an autonomous mode, where the human driver has no input on the control of the vehicle's acceleration, deceleration or steering, a switch to manual mode can be made using input at a steering wheel, acceleration or deceleration pedal, or other some other user input. When using one of these inputs to change modes, there is an inherent delay between the time when the driver uses the input to when the vehicle's control computing devices (which control the vehicle in the autonomous driving mode) completely release control of the acceleration, deceleration and steering. In order to allow a safe transition where the driver is guaranteed control of the vehicle this "transition" may effectively cause the vehicle's control computing devices to immediately cease sending signals to the acceleration, deceleration, and steering systems of the vehicle.

BRIEF SUMMARY

One aspect of the disclosure provides a method of controlling a transition between a manual driving mode and an autonomous driving mode of a vehicle. The method includes controlling, by one or more processors of one or more control computing devices, the vehicle in the autonomous driving mode; while controlling the vehicle in the autonomous driving mode and decelerating at a given rate, receiving, by the one or more processors at a user input of the vehicle, input requesting a transition from the autonomous driving mode to the manual driving mode; in response to the input, transitioning the vehicle to the manual driving mode; and after transitioning the vehicle to the manual driving mode, sending, by the one or more processors, deceleration signals to a deceleration actuator thereby causing the vehicle to continue to decelerate at the given rate.

In one example, the method also includes, after receiving the input, determining that the one or more control computing devices are currently causing the vehicle to deceleration, and wherein sending the deceleration signals is based on the determination that the control computing devices are currently causing the vehicle to deceleration. In this example, the method also includes, after determining that the one or more control computing devices are currently causing the vehicle to deceleration, comparing an amount of deceleration currently requested by the control computing devices to a threshold deceleration, and wherein sending the deceleration signals is further based on the comparison. In another example, the method also includes, identifying a distance that user input has moved to cause the input, and wherein the deceleration signals are sent further based on the distance. In another example, the method also includes, identifying a force on the user input to cause the input, and wherein the deceleration signals are sent further based on a magnitude of the force. In another example, the deceleration signals are sent according to a current plan of operation by the one or more control computing devices when that the input is received. In another example, the method also includes continuing to send the deceleration signals to the deceleration actuator until a deceleration signal initiated by input at a deceleration pedal of the vehicle reaches the deceleration actuator. In another example, the method also includes continuing to send the deceleration signals to the deceleration actuator until an acceleration signal initiated by user input at a deceleration pedal of the vehicle reaches an acceleration actuator of the vehicle that causes the vehicle to accelerate. In another example, the user input is a steering wheel of the vehicle. In another example, the user input is a brake pedal of the vehicle. In another example, while controlling the vehicle in the autonomous driving mode and decelerating at the given rate, the vehicle is also changing orientation at a second given rate, and wherein the method further comprises, after transitioning the vehicle to the manual driving mode, sending, by the one or more processors, steering orientation signals to a steering actuator thereby causing the vehicle to continue to change orientation at the second given rate.

Another aspect of the disclosure provides a system for controlling a transition between a manual driving mode and an autonomous driving mode of a vehicle. The system comprising one or more processors configured to control the vehicle in the autonomous driving mode; while controlling the vehicle in the autonomous driving mode and decelerating at a given rate, receive, at a user input of the vehicle, input requesting a transition from the autonomous driving mode to the manual driving mode; in response to the input, transition the vehicle to the manual driving mode; and after transitioning the vehicle to the manual driving mode, send deceleration signals to a deceleration actuator thereby causing the vehicle to continue to decelerate at the given rate.

In one example, the one or more processors are further configured to, after receiving the input, determine that the one or more control computing devices are currently causing the vehicle to deceleration, and wherein sending the deceleration signals is based on the determination that the one or more control computing devices are currently causing the vehicle to deceleration. In this example, the one or more processors are further configured to, after determining that the one or more control computing devices are currently causing the vehicle to deceleration, compare an amount of deceleration currently requested by the one or more control computing devices to a threshold deceleration, and wherein sending the deceleration signals is further based on the comparison. In another example, the one or more processors are further configured to, identify a distance that user input has moved to cause the input, and wherein the deceleration signals are sent further based on the distance. In another example, the one or more processors are further configured to identify an amount of force on the user input to cause the input, and wherein the deceleration signals are sent further based on the amount of force. In another example, the one or more processors are further configured to continue to send the deceleration signals to the deceleration actuator until a deceleration signal initiated by input at a deceleration pedal of the vehicle reaches the deceleration actuator. In another example, the one or more processors are further configured to continue to send the deceleration signals to the deceleration actuator until an acceleration signal initiated by user input at a deceleration pedal of the vehicle reaches an acceleration actuator of the vehicle that causes the vehicle to accelerate. In another example, while controlling the vehicle in the autonomous driving mode and decelerating at the given rate, the vehicle is also changing orientation at a second given rate, and the one or more processors are further configured to, after transitioning the vehicle to the manual driving mode, send steering orientation signals to a steering actuator thereby causing the vehicle to continue to change orientation at the second given rate. In another example, the system also includes the vehicle.

DETAILED DESCRIPTION

Overview

Vehicles may have many different modes of operation including manual and autonomous driving modes as well as various modes there between. As noted above, when operating in an autonomous mode, where the human driver has no input on the control of the vehicle's acceleration, deceleration or steering, a switch to manual mode can be made using input at a steering wheel, acceleration or deceleration pedal, or other some other user input. In some instances, the transition from the autonomous driving mode to the manual driving mode may occur while the vehicle's control computing devices are sending signals to the actuators of the steering, acceleration or deceleration systems. For instance, signals may be sent to the vehicle's one or more deceleration actuators to decelerate or cause the vehicle to brake in order to reduce the speed of the vehicle.

When these signals are ceased during the transition, the resulting reduction in deceleration of the vehicle can actually feel to the driver as if the vehicle is inappropriately understeering, deceleration or accelerating depending upon the situation. This can be especially uncomfortable for a driver where the transition is a result of the driver feeling the need to take control of the vehicle in a situation in which the driver feels additional braking is necessary (i.e. the driver is concerned that a collision may occur, etc.).

In order to assist the driver during this transition period, additional steering, acceleration and/or deceleration signals may be sent to the vehicle's various actuators. These signals may actually continue during and after the transition period until the control computing devices recognize the driver's intention or desire to disengage the autonomous mode before or when the driver commanded steering, acceleration, or braking reaches the same magnitude as the control computing devices were previously commanding. This timing can be tuned to feel "natural" and comfortable to a driver. In addition, this reduces the feeling that the vehicle is understeering, decelerating, or accelerating when the driver is given control of the vehicle.

The features described herein may allow for a smooth transition from an autonomous driving mode to a manual driving mode. In other words, as noted above, when the vehicle is changing the orientation of the vehicle (steering), decelerating, or accelerating at the time of the transition, these features may greatly reduce the discomfort of a driver caused by a feeling of inappropriate acceleration of the vehicle. This also materially reduces stopping distance in the event of an emergency or forceful driver takeover since the vehicle does not drop braking pressure for the time between when the transition is detected and when the driver pushes the pedal to its maximum displacement.

Example Systems

Figure 1:
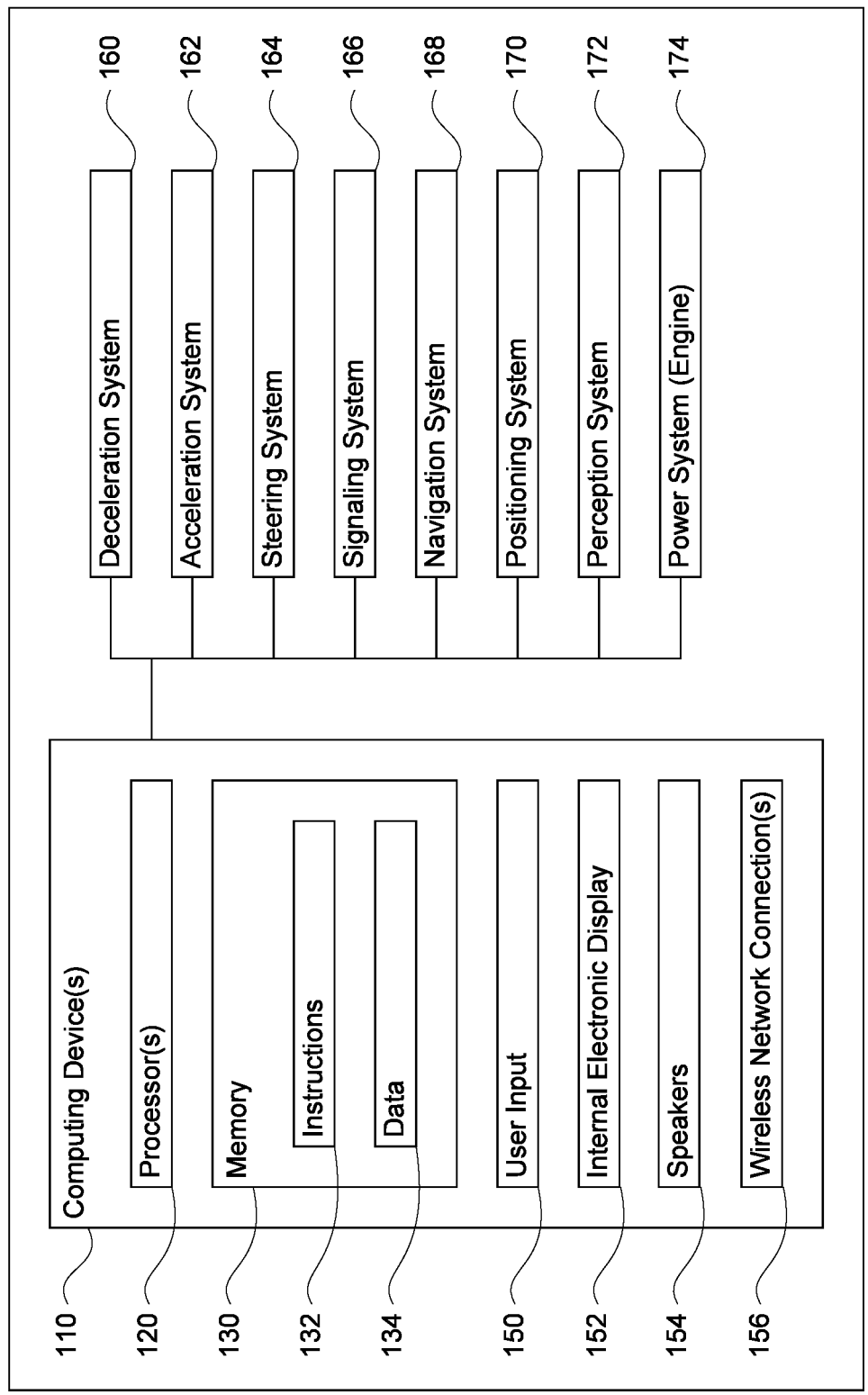
FIG. 1 is a functional diagram of an example vehicle in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
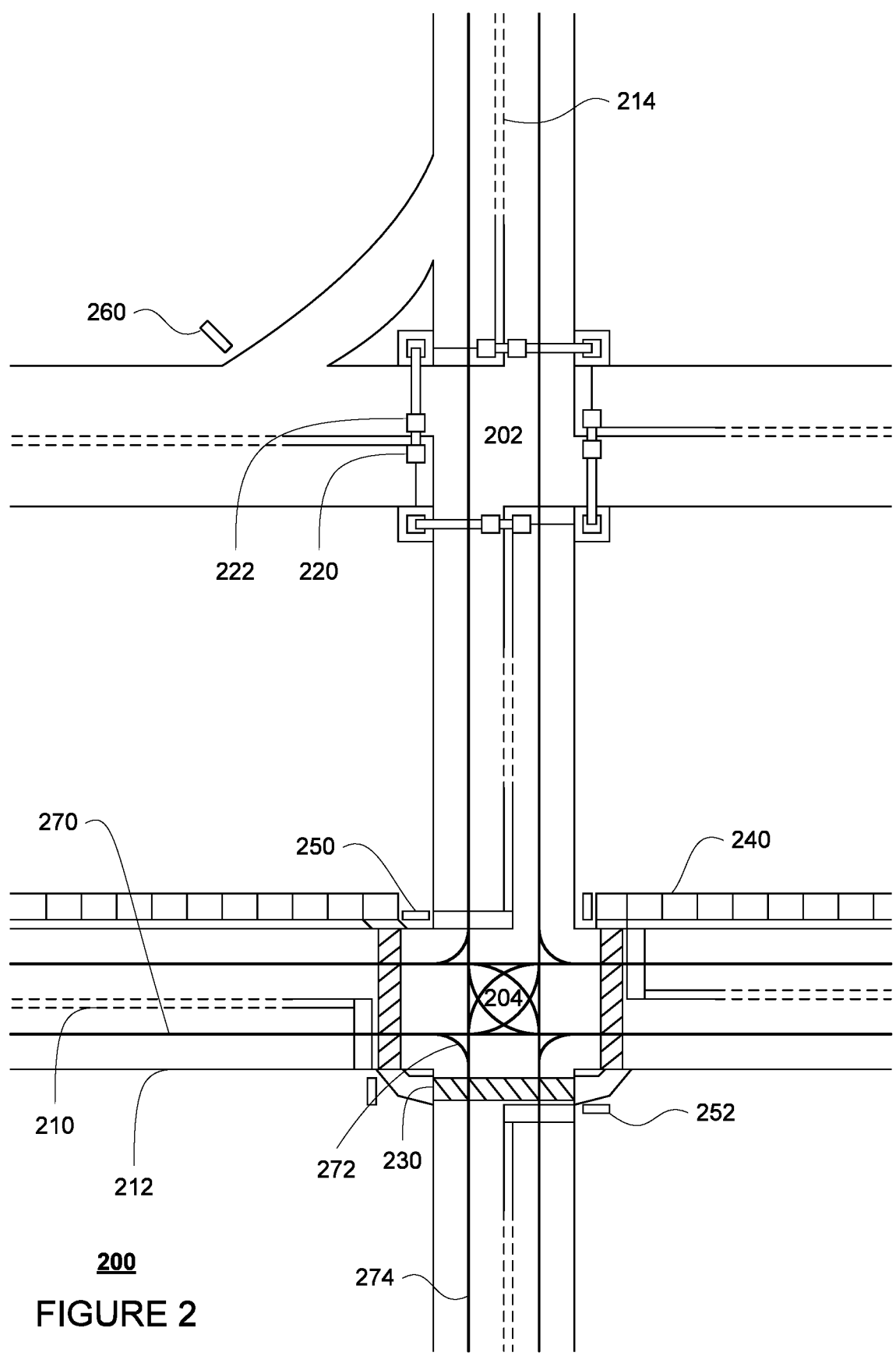
FIG. 2 is an example of map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
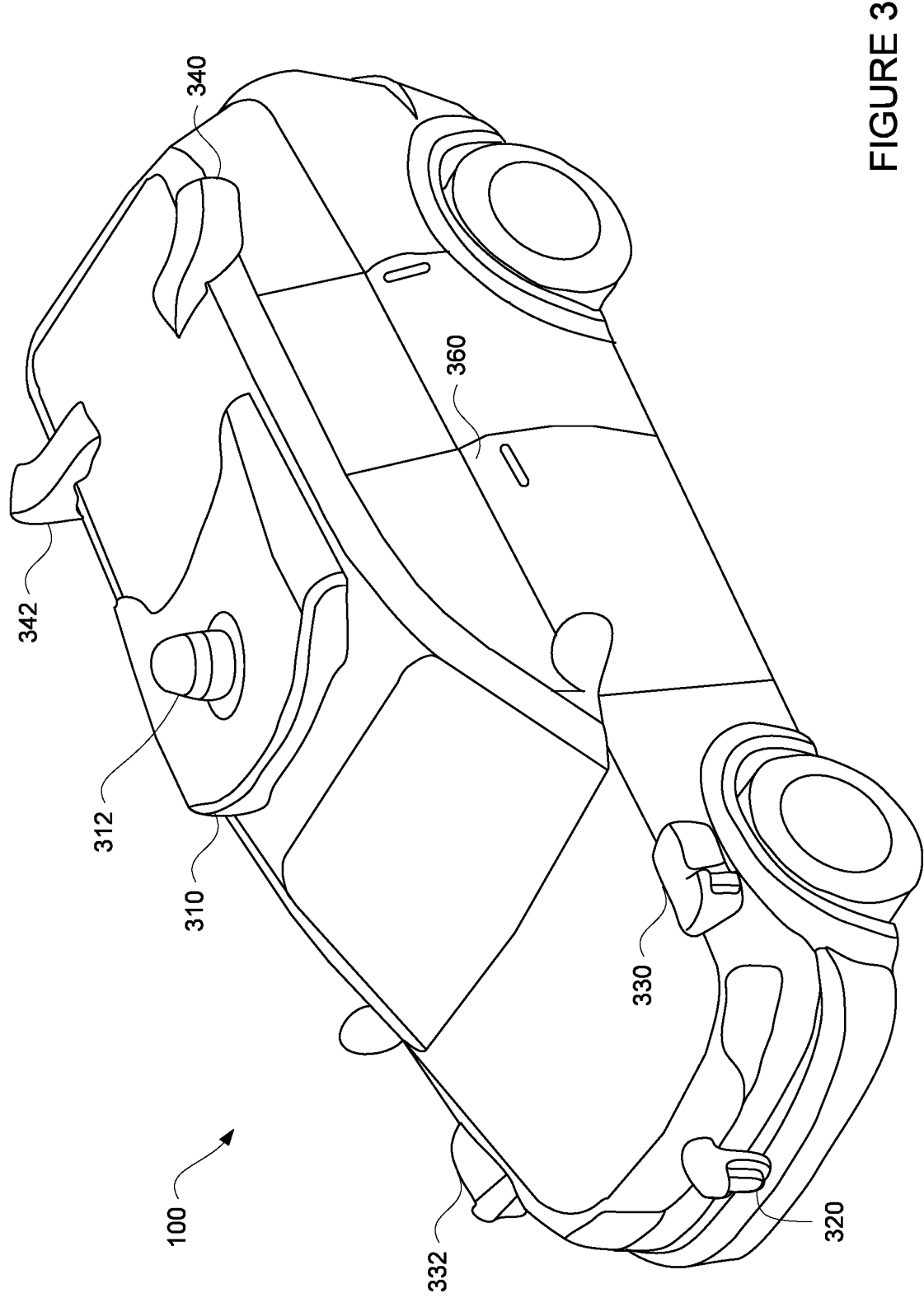
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle by controlling various components. By way of example, computing devices 110 may navigate the vehicle to a destination location completely autonomously using data from the detailed map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

When operating in the autonomous driving mode, as the vehicle moves through its environment, the perception system 172 may send the computing devices 110 sensor data identifying objects in the vehicle's environment as well as their characteristics. This information may be combined with feedback information from the vehicle's various systems as well as the map information in order to determine how to maneuver the vehicle through its environment. As part of this, the computing devices 110 may generate a trajectory for the vehicle to follow through its environment for some period into the future. This trajectory may include control requirements for the position and speed of the vehicle at different times during the period. For example, a trajectory may include a geometry component and a speed component. The geometry component may define one or more future positions of the vehicle at different times during the period while the speed component may define one or more future speeds of the vehicle at different times during the period.

Figure 4:
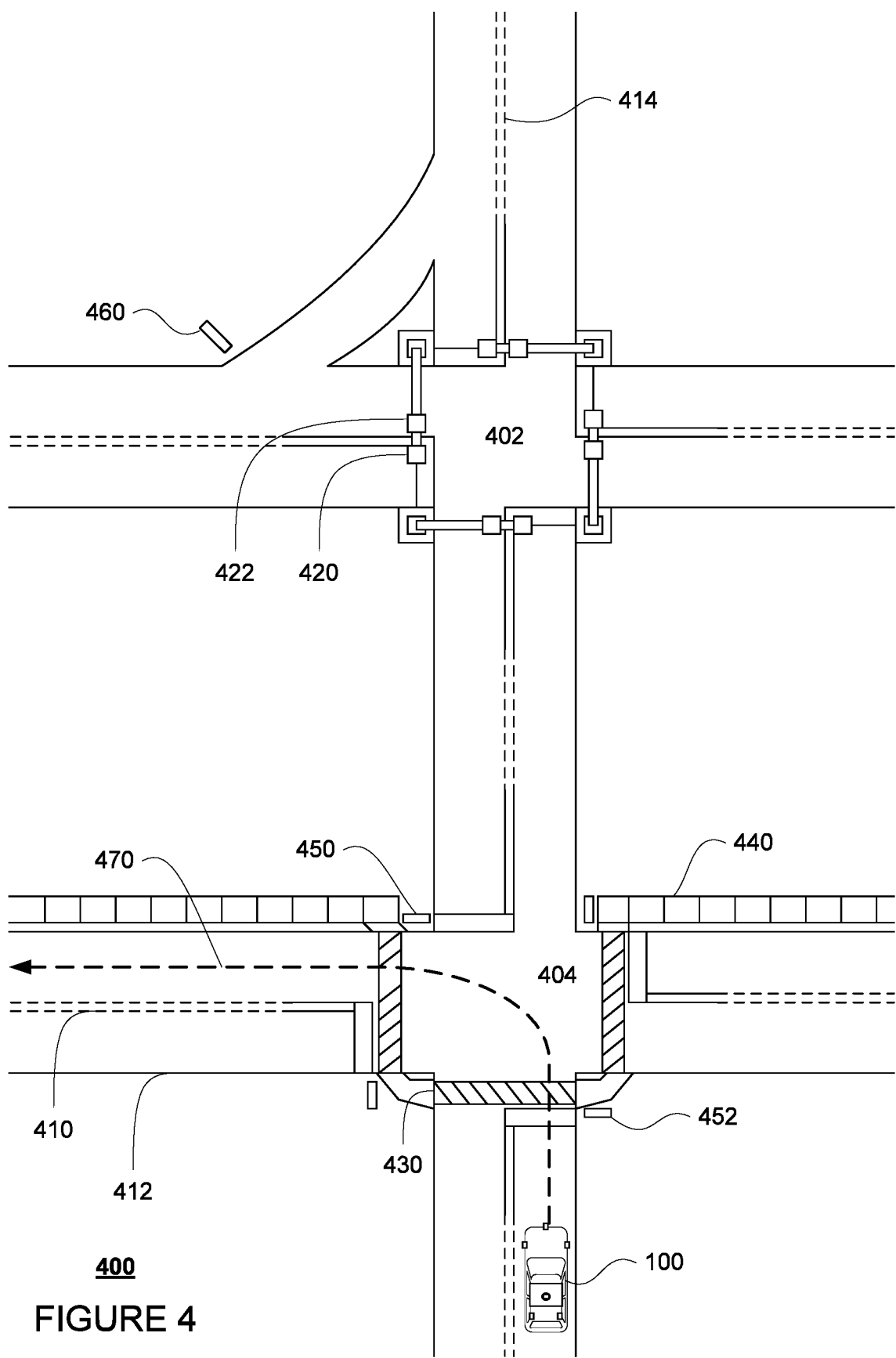
FIG. 4 is an example bird's eye view of a geographic area in accordance with aspects of the disclosure.

For instance, FIG. 4 depicts vehicle 100 being maneuvered on a section of roadway 400 including intersections 402 and 404. In this example, intersections 402 and 404 correspond to intersections 202 and 204 of the map information 200, respectively. In this example, lane lines 410, 412, and 414 correspond to the shape, location, and other characteristics of lane lines 210, 212, and 214, respectively. Similarly, crosswalk 430 corresponds to the shape, location, and other characteristics of crosswalk 230, respectively; sidewalks 440 correspond to sidewalks 240; traffic signal lights 420, 422 correspond to traffic signal lights 220, 222, respectively; stop signs 450, 452 correspond to stop signs 250, 252, respectively; and yield sign 460 corresponds to yield sign 260. In this example, the computing devices 110 have used map information 200 to determine a trajectory 470 for vehicle 100 to follow in order to reach a destination (not shown). In this example, trajectory 470 includes a speed component and geometry component (same as what is shown in FIG. 4 for trajectory 470) that will require that vehicle 100 may a left turn at intersection 404.

Figure 5:
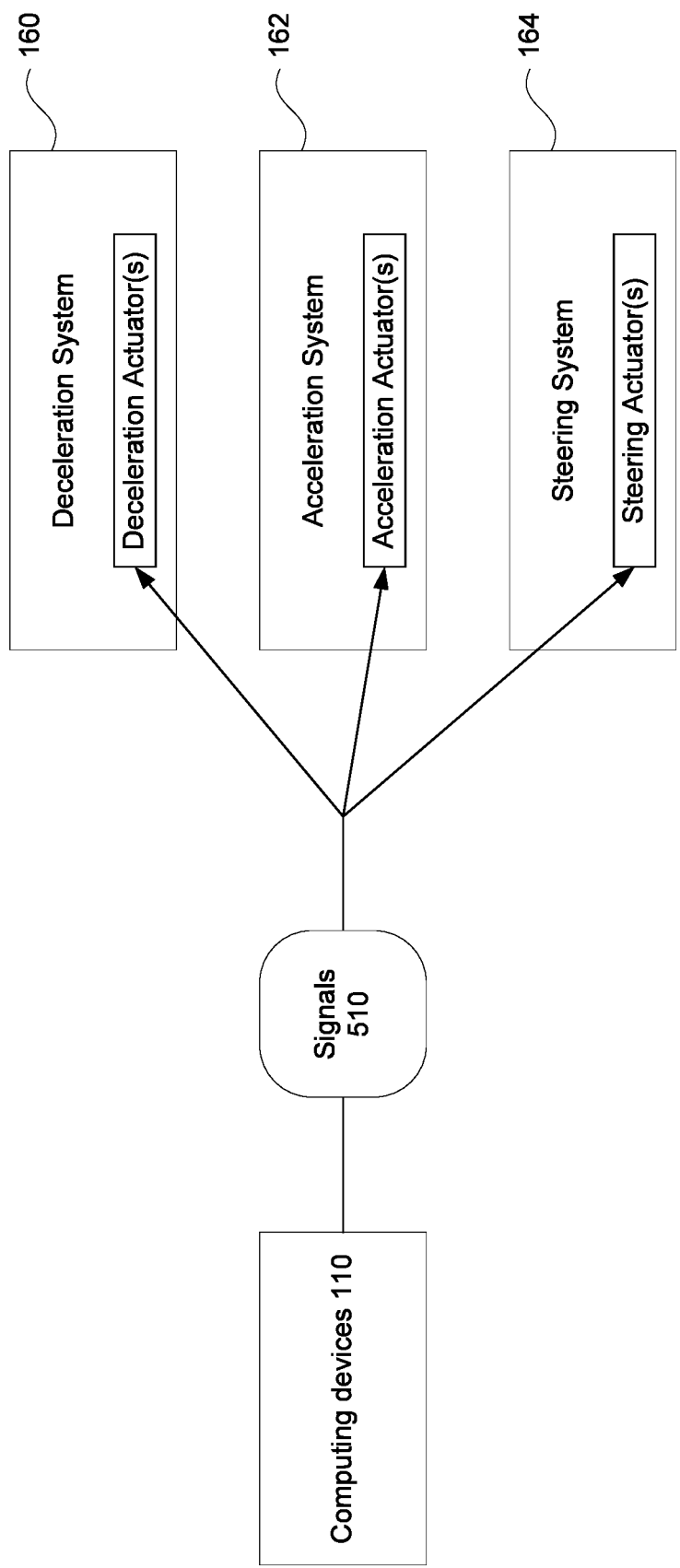
FIG. 5 is an example functional diagram in accordance with aspects of the disclosure.

In order to proceed along the trajectory 470, the computing devices 110 may use the trajectory to generate and send signals including commands to the various actuators of the vehicle, including for instance, steering orientation signals with steering orientation commands to the one or more steering actuators, acceleration signals with acceleration commands to the one or more acceleration actuators, and/or deceleration signals with deceleration commands to the one or more deceleration actuators. For instance, as shown in FIG. 5, computing devices 110 send signals 510 to each of the one or more deceleration actuators of the deceleration system 160, one or more acceleration actuators of the acceleration system 162, and one or more steering actuators of the steering system 164 as needed in order to follow trajectory 470. The actuators, in turn, may cause the vehicle to control the orientation, acceleration, and deceleration of the vehicle according to the commands to follow the trajectory.

In some instances, the driver may want to take control of one or more of the steering, acceleration, and deceleration from the computing devices 110. As an example, returning to FIG. 4, the driver may want to make the turn at intersection 404 more quickly, or may be concerned that the vehicle is going to take the turn and come too close to another vehicle or object. Of course, the driver may simply want to take control of the vehicle "just because" or for any number of reasons.

Figure 6:
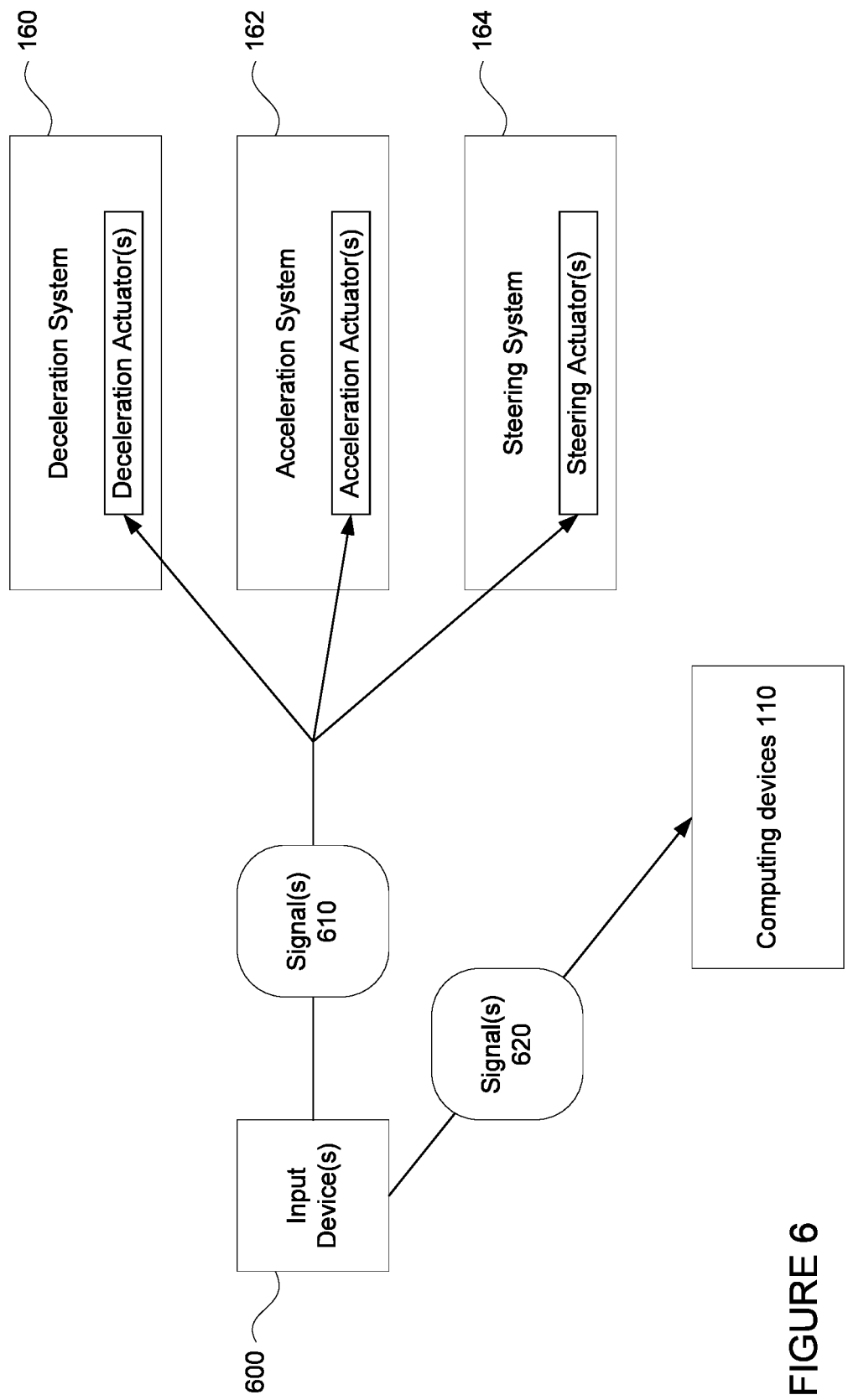
FIG. 6 is another example functional diagram in accordance with aspects of the disclosure.

For instance as shown in FIG. 6 and noted above, this may be achieved by the driver using one of input devices 600, such as a steering wheel, accelerator pedal or brake pedal. In this regard, the driver may use one or more of the input devices 600 of the vehicle to request control of the vehicle, or rather, that the vehicle switch from the autonomous mode to the manual driving mode. The one or more input devices, depending upon which one or more are used by the driver, then send signals 610 to one or more of the one or more deceleration actuators of the deceleration system 160, one or more acceleration actuators of the acceleration system 162, or one or more steering actuators of the steering system 164. For instance, the driver may use input devices including both an accelerator pedal and steering wheel, which may send signals to each of the acceleration actuators and steering actuators. Similarly, the driver may use input devices including both a brake pedal and steering wheel, which may send signals to each of the deceleration actuators and steering actuators. Alternatively, the driver may use only a single input device, such as a brake pedal, accelerator pedal, or steering wheel. In this regard, the single input device may send a signal to the corresponding actuators.

Although not shown in the figures, vehicle 100 may include additional redundant features and systems. This may include systems to send control signals, redundant input devices and systems (for instance for requesting a transition to a manual mode), redundant braking, steering, and acceleration systems, etc.

Once the driver initiates this input, the computing devices 110 may also receive one or more signals 620 indicating that the driver requests to take control of the vehicle. For instance the signals 620 may indicate that the driver wants to transition into a manual driving mode or a semiautonomous mode (where the computing devices 110 continue to control at least one of steering, acceleration or deceleration). For simplicity, the transitions described herein relate to transitions from the autonomous driving mode to a manual driving mode, though other transitions may also be used and would function in similar ways, though the computing devices 110 would retain control of at least one of the steering, acceleration, and deceleration after a transition period discussed further below.

In response to the signal indicating that the driver requests to take control of the vehicle, the computing devices 110 may begin to transition control of the steering, acceleration, and deceleration systems to the driver and thereby transition the vehicle to the manual driving mode (or semiautonomous mode). This transition may occur during a transition period. During the transition period, the computing devices 110 may send signals to the actuators, as shown in the example of FIG. 5, indicating that the vehicle is transitioning to the manual driving mode. In response, the actuators may themselves transition to the manual diving mode whereby the actuators will not accept or act upon additional commands from the computing devices 110 until the vehicle transitions back to the autonomous driving mode. Once the transition period is complete, only inputs from the driver will be used to control the vehicle in the manual driving mode.

As noted above, in some instances, the driver input indicating that the driver would like to switch from the autonomous driving mode to the manual driving mode may occur while the computing devices 110 are sending signals to the actuators of the steering, acceleration or deceleration systems. For instance, signals may be sent to the vehicle's one or more deceleration actuator to decelerate or cause the vehicle to brake in order to reduce the speed of the vehicle prior to making the turn in order to follow trajectory 470. In addition, signals may also be sent to the vehicle's one or more steering actuators to change the orientation of the vehicle in order to follow trajectory 470.

As noted above, when these signals are ceased during the transition, the resulting reduction in deceleration of the vehicle can actually feel to the driver as if the vehicle is inappropriately understeering, deceleration or accelerating depending upon the situation. For instance, if the computing devices 110 are sending deceleration signals to the one or more deceleration actuators which are causing the vehicle to decelerate, and the driver wants the vehicle to brake harder, the driver may attempt to transition the vehicle to the manual driving mode by using the brake pedal. However, there may be a delay between when the one or more deceleration actuators stop receiving deceleration signals from the computing devices 110 and when the one or more deceleration actuators are able to receive and act upon the driver input from the brake pedal. As a result, for a brief period, the driver may feel as if the vehicle is actually accelerating, even though it is merely a reduction in the amount of deceleration. This can be especially uncomfortable for a driver where the transition is a result of the driver feeling the need to take control of the vehicle in a situation in which the driver feels additional braking is necessary (i.e. the driver is concerned that a collision may occur, etc.).

In order to assist the driver during this transition period, additional steering, acceleration and/or deceleration signals may be sent to the vehicle's various actuators after the driver uses the input devices to request that the vehicle transition to the manual driving mode. For instance, these additional signals may cause the actuators to continue to control the vehicle according to the trajectory, decelerating, accelerating and steering, for some brief period of time. This reduces the feeling of the driver that the vehicle is understeering, decelerating, or accelerating when the driver is given control of the vehicle.

These additional signals may actually continue during and even after the transition period until the computing devices 110 recognize the driver's intention or desire to disengage the autonomous mode before or when the driver commanded steering, acceleration, or braking reaches the same magnitude as the control computing devices were previously commanding. This timing can be tuned to feel "natural" and comfortable to a driver, again in order to reduce the feeling that the vehicle is understeering, decelerating, or accelerating when the driver is given control of the vehicle.

For instance, the additional signals may be continued according to the control computing device's current trajectory plan for the vehicle for some brief period into the future, such as 1 or 2 seconds or more or less, or until the input from the driver is received by the steering, deceleration or acceleration actuators and acted upon by those actuators as described above. In this regard, signals received by the vehicle's actuators from the input devices may "overrule" signals from the computing devices 110.

In addition, the additional signals sent may or may not be dependent upon which input the driver uses to transition control of the vehicle. For example, if the vehicle was in the middle of swerving to avoid an obstacle, and a driver stepped on the brake, the vehicle may smoothly transition control of the steering actuator as well as the deceleration actuator.

Alternatively, the additional signals that are sent to the vehicle's actuator(s) may include different instructions depending on the type of input by the driver at the input for steering, acceleration or deceleration. In this regard, if the driver attempts to transition from the autonomous driving mode to the manual driving mode by using the steering input, deceleration input or acceleration input, the force of the input (if a brake or acceleration pedal) as well as the distance the input is moved may be used to determine how the signals are continued. For instance, the magnitude if the force on a brake or acceleration pedal may be measured using a force input device, and this information may be sent back to the computing devices 110. Similarly, the distance the brake or acceleration pedal is moved or the change in orientation of the steering wheel may be measured using a distance or angular measurement device, and this information may be sent back to the computing devices 110. The computing devices 110 may then use this information to determine what signals to send to any of the vehicle's actuators.

As an example, if the driver only lightly pushes, for instance with very little force, on the brake pedal such that is moves only a short distance, the additional deceleration signals may cause the deceleration actuator to continue only a small amount of deceleration of the vehicle. In other words, the amount of deceleration would less than what the computing devices 110 would have signaled to the one or more deceleration actuators if the transition had not occurred. Similarly, if the driver uses much more force on the brake pedal, such that the brake pedal moves a greater distance, the additional deceleration signals may cause the deceleration actuator to continue the same amount of deceleration of the vehicle. In some instances, the additional deceleration signals may increase the deceleration of the vehicle if the force on the brake pedal and/or the distance moved is very great.

The additional signals can also be adjusted according to the configuration of the vehicle. For instance, if the computing devices 110 are able to directly control the deceleration and acceleration actuators (i.e. by physically moving the pedals), rather than indirectly by sending signals through the inputs used by the driver, the position of the brake pedal may be such that the pedal is already in a braking position when the driver uses the pedal. In such examples, the additional signals may not be needed or may be phased out quicker.

In some situations in which the vehicle is moving slowly or accelerating slowly, the driver may not even notice the additional steering, acceleration or braking commands. In other words, the change in the steering orientation caused by the lack of continued steering signals, the change in the acceleration caused by the lack of continued acceleration signals, and/or the change in the deceleration caused by the lack of continued braking signals would be very small or such that the driver may not notice. In this regard, the additional signals may always be sent or may be sent only when the commands within the signals being sent by the computing devices 110 to the vehicle's actuators meet certain thresholds. For instance, the computing devices 110 may only send additional signals if the current signals include commands for the one or more deceleration actuators to decelerate the vehicle at a certain rate, for the one or more acceleration actuators to accelerate the vehicle at a certain rate, or for the one or more steering actuators to change the orientation of the vehicle at a certain rate.

Figure 7:
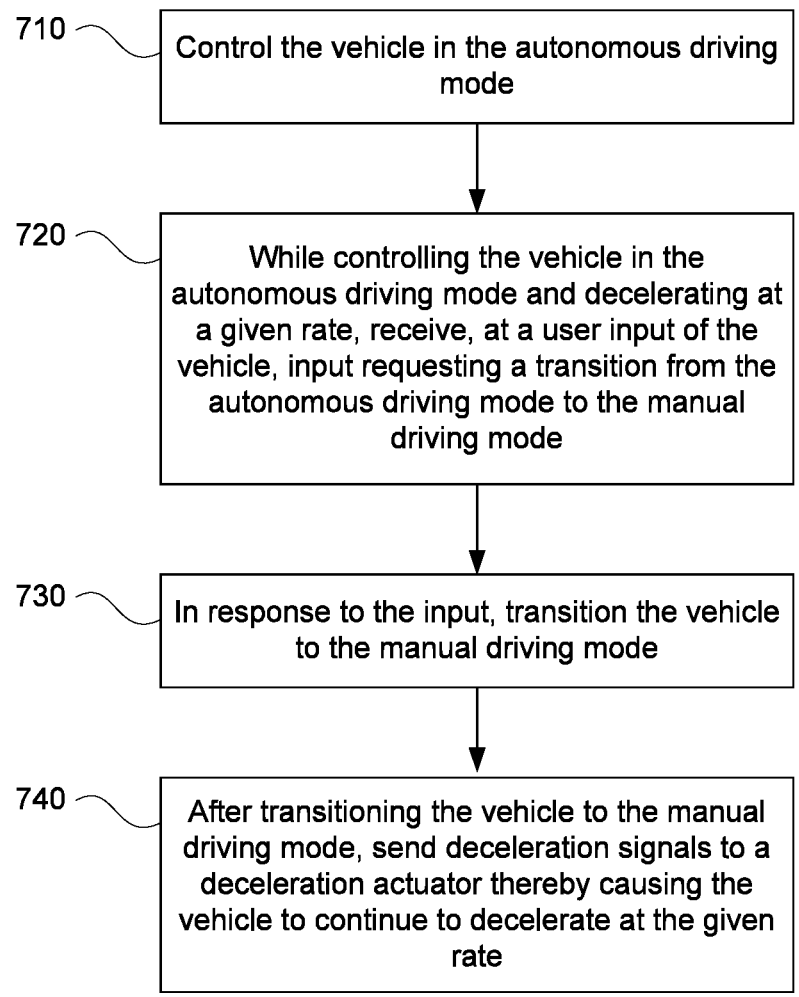
FIG. 7 is an example flow diagram in accordance with aspects of the disclosure.

FIG. 7 includes an example flow diagram 700 of some of the examples methods for controlling a transition between a manual driving mode and an autonomous driving mode of a vehicle as described above. In this example, the steps of flow diagram may be performed by one or more processors of one or more computing devices, such as processors 120 of computing devices 110. In this example, at block 710, the vehicle is controlled in the autonomous driving mode. While controlling the vehicle in the autonomous driving mode and decelerating at a given rate, input requesting a transition from the autonomous driving mode to the manual driving mode is received at a user input of the vehicle at block 720. In response to the input, the vehicle is transitioned to the manual driving mode at block 730. After transitioning the vehicle to the manual driving mode, deceleration signals are sent to a deceleration actuator thereby causing the vehicle to continue to decelerate at the given rate at block 740.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a transition between a manual driving mode and an autonomous driving mode of a vehicle, the method comprising:
controlling, by one or more processors of one or more control computing devices, the vehicle in the autonomous driving mode by changing orientation of the vehicle at a given rate;
while controlling the vehicle in the autonomous driving mode and changing orientation of the vehicle at the given rate, receiving, by the one or more processors at a user input of the vehicle, input requesting a transition from the autonomous driving mode to the manual driving mode;
in response to the input, transitioning the vehicle to the manual driving mode; and
after transitioning the vehicle to the manual driving mode, sending, by the one or more processors over a given period, steering orientation signals to an orientation actuator thereby causing the vehicle to continue to change orientation at the given rate during the given period.

2. The method of claim 1, further comprising:
after receiving the input, determining that the one or more control computing devices are currently causing the vehicle to change orientation; and
determining the given period based on the determination that the one or more control computing devices are currently causing the vehicle to change orientation.

3. The method of claim 2, further comprising, after determining that the one or more control computing devices are currently causing the vehicle to change orientation, comparing an amount of change in orientation of the vehicle currently requested by the one or more control computing devices to a threshold change in orientation, and wherein the given period is further determined based on the comparison.

4. The method of claim 1, further comprising, identifying a distance that user input has moved to cause the input, and wherein the given period over which the steering orientation signals are sent is based on the distance.

5. The method of claim 1, further comprising, identifying a force on the user input to cause the input, and wherein the given period over which the steering orientation signals are sent is based on a magnitude of the force.

6. The method of claim 1, wherein the given period over which the steering orientation signals are sent is based upon a current plan of operation by the one or more control computing devices when that the input is received.

7. The method of claim 1, wherein the given period over which the steering orientation signals are sent to the orientation actuator is based upon an amount of time required for a steering orientation signal initiated by input at a steering input device of the vehicle to reach the orientation actuator.

8. The method of claim 7, wherein the steering input device is a steering wheel of the vehicle.

9. The method of claim 1, wherein the user input is a steering wheel of the vehicle.

10. The method of claim 1, wherein the user input is a brake pedal of the vehicle.

11. A system for controlling a transition between a manual driving mode and an autonomous driving mode of a vehicle, the system comprising one or more processors configured to:
    control the vehicle in the autonomous driving mode by changing orientation of the vehicle at a given rate;
    while controlling the vehicle in the autonomous driving mode and changing orientation of the vehicle at the given rate, receive, at a user input of the vehicle, input requesting a transition from the autonomous driving mode to the manual driving mode;
    in response to the input, transition the vehicle to the manual driving mode; and
    after transitioning the vehicle to the manual driving mode, send steering orientation signals to an orientation actuator for a given period thereby causing the vehicle to continue to change orientation at the given rate during the given period.

12. The system of claim 11, wherein the one or more processors are further configured to:
    after receiving the input, determine that the one or more control computing devices are currently causing the vehicle to change orientation, and
    determine the given period based on the determination that the one or more control computing devices are currently causing the vehicle to change orientation.

13. The system of claim 12, wherein the one or more processors are further configured to, after determining that the one or more control computing devices are currently causing the vehicle to change orientation, compare an amount of change in orientation currently requested by the one or more control computing devices to a threshold orientation, and determine the given period over which the steering orientation signals are sent further based on the comparison.

14. The system of claim 11, wherein the one or more processors are further configured to, identify a distance that user input has moved to cause the input, and wherein the given period over which the steering orientation signals are sent is based on the distance.

15. The system of claim 11, wherein the one or more processors are further configured to identify an amount of force on the user input to cause the input, and wherein the given period over which the steering orientation signals are sent is based on the amount of force.

16. The system of claim 11, wherein the fixed period over which the one or more processors continue to send the steering orientation signals to the orientation actuator is based upon the time required for a steering orientation signal initiated by input at a steering input of the vehicle to reach the orientation actuator.

17. The system of claim 16, wherein the steering input is a steering wheel.

18. The system of claim 16, further comprising the vehicle including the steering input and the orientation actuator.

19. The system of claim 11, wherein the user input is a steering wheel of the vehicle.

20. The method of claim 11, wherein the one or more processors are further configured to determine the given period based upon a current plan of operation by the one or more control computing devices when that the input is received.

* * * * *

UNITED STATES PATENT AND TRADEMARK OFFICE
CERTIFICATE OF CORRECTION

| | | |
|---|---|---|
| PATENT NO. | : 11,364,928 B1 | Page 1 of 1 |
| APPLICATION NO. | : 16/685209 | |
| DATED | : June 21, 2022 | |
| INVENTOR(S) | : Ethan Stark et al. | |

It is certified that error appears in the above-identified patent and that said Letters Patent is hereby corrected as shown below:

In the Claims

Claim 12, Column 13, Line 33:
Now reads: "that the one"; should read -- that one --

Claim 20, Column 14, Line 32:
Now reads: "The method"; should read -- The system --

Claim 20, Column 14, Line 34:
Now reads: "by the one"; should read -- by one --

Signed and Sealed this
Seventh Day of November, 2023

Katherine Kelly Vidal
*Director of the United States Patent and Trademark Office*